(12) United States Patent
Stephen et al.

(10) Patent No.: US 8,092,221 B2
(45) Date of Patent: Jan. 10, 2012

(54) SCREEN READER LIST VIEW PRESENTATION METHOD

(75) Inventors: Joseph Stephen, St. Petersburg, FL (US); Eric Damery, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 553 days.

(21) Appl. No.: 11/164,192

(22) Filed: Nov. 14, 2005

(65) Prior Publication Data

US 2006/0115799 A1 Jun. 1, 2006

Related U.S. Application Data

(60) Provisional application No. 60/522,847, filed on Nov. 12, 2004.

(51) Int. Cl.
*G06K 9/00* (2006.01)
(52) U.S. Cl. ........................................................ 434/116
(58) Field of Classification Search .................. 434/112, 434/116, 379, 185; 704/260, 270, 271; 715/509, 715/729, 978
See application file for complete search history.

(56) References Cited

U.S. PATENT DOCUMENTS

| | | | | | |
|---|---|---|---|---|---|
| 4,766,529 A | * | 8/1988 | Nakano et al. | ................. | 704/275 |
| 5,175,810 A | * | 12/1992 | Young et al. | ................. | 715/217 |
| 5,446,882 A | * | 8/1995 | Capps et al. | ............... | 707/104.1 |
| 6,496,979 B1 | * | 12/2002 | Chen et al. | .................... | 717/178 |
| 6,889,337 B1 | * | 5/2005 | Yee | ................................. | 714/1 |
| 6,961,944 B2 | * | 11/2005 | Chew et al. | .................... | 719/328 |
| 2003/0039948 A1 | * | 2/2003 | Donahue | ........................ | 434/322 |
| 2003/0200533 A1 | * | 10/2003 | Roberts et al. | ................ | 717/124 |

* cited by examiner

*Primary Examiner* — David L Lewis
*Assistant Examiner* — Eric M Thomas
(74) *Attorney, Agent, or Firm* — Anton J. Hopen; Smith & Hopen, P.A.

(57) ABSTRACT

A speech-generating product for controlling the output of tabular or other composite data in a computer having a screen reader function. The product provides a customized control presentation tool that configures a screen reader to present tabular or other composite data to a user in the order most useful to the user. The tool includes the ability to configure the screen reader independently for both speech and Braille output on a control by control basis. This customized control presentation is saved in permanent storage. Consequently, each time the screen reader is presented with this instance of the control, the screen reader immediately knows how to present it to the user. The software product allows a user to modify the output by the screen reader of the data according to preferences configurable by the user. These preferences may include the ability to skip display information, to specify the order in which the screen reader presents the display information and the ability to alter the headers associated with the display information. By altering the headers the user may annotate the headers to provide additional information about the underlying data. The headers may also be output in an alternative voice by a speech synthesizer to queue a user to a change of information. The user may also specify that certain display information is sent by the screen reader to one display device while other display information is sent to an alternative display device.

24 Claims, 2 Drawing Sheets

SCREEN READER LIST VIEW PRESENTATION METHOD

CROSS-REFERENCE TO RELATED APPLICATIONS

This application claims priority to U.S. Provisional Patent Application No. 60/522,847, filed Nov. 12, 2004, the contents of which are herein incorporated by reference.

FIELD OF INVENTION

This invention pertains to screen reader applications for computer systems. More specifically, this invention pertains to controlling the output of tabular or other composite data by a computer having a screen reader function.

BACKGROUND OF INVENTION

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

A screen reader is software which interprets the output of a computer as sent to a computer screen and converts it into alternative output. Typically, the alternative output is in the form of synthetic speech or Braille characters. Screen readers are particularly useful for a blind or low vision user. One such screen reader is JAWS® for Windows. When installed upon a personal computer, JAWS® provides access to the operating system, software applications and the Internet. JAWS® includes a speech synthesizer that cooperates with the sound card in the personal computer to read aloud information appearing upon the computer monitor screen or that is derived through communicating directly with the application or operating system. Thus, JAWS® provides access to a wide variety of information, education and job related applications. Additionally, JAWS® includes an interface that can provide output to refreshable Braille displays. Current JAWS® software supports all standard Windows® applications, including Microsoft Office XP®. JAWS® supports Internet Explorer with special features, such as, links lists, frame lists, forms mode and reading of HTML labels and graphic labels included on web pages. Upon entering an HTML document via an Internet link, JAWS® actuates a Virtual PC Cursor that mimics the functions of the PC cursor. The Virtual PC cursor causes JAWS® to signal the speech synthesizer to speak the number of frames in a document being read in Internet Explorer and the number of links in the frame currently being displayed. Also, JAWS® causes the speech synthesizer to read graphics labeled by alternate tags in HTML code.

Until now, screen readers have had a limited ability to select information to speak or Braille according to user's preference. One problem frequently encountered with formats involving large tabular arrays of data is that the data, as displayed on a computer screen, may include a large amount of irrelevant data that a user might desire to skip or ignore. For the typical sighted user this does not present a great problem. A typical sighted user, or "typical user", can make a cursory scan of the window of data until he or she arrives at the desired information. In performing that scan, a great amount of data can be passed over quickly until the desired information is found. That desired information is then considered in greater detail while the scanned information is otherwise ignored and forgotten. For the typical user such a process is a trivial task. For a vision-impaired or blind user it is not nearly so simple. The blind or vision-impaired user will frequently utilize a screen reader to access the information that would otherwise be displayed on the screen. To output the information, the screen reader must serially pass the information to the display device. By "display" it is meant that the information is presented to the user in a manner in which the information can be meaningfully assessed by the user. Display is not limited to visual presentations of data, but may include other means of presenting such as auditory output and Braille devices. The user experiences the associated information in the order provided by the underlying application. A great amount of time can be spent waiting to arrive at the information sought by the user. For example, when an application gains focus, such as focus on a table or list of items, the screen reader could not be instructed to only read certain columns of the table while ignoring other columns. Likewise, the screen reader could not precede the reading of the column data by announcing the column's heading in a different voice. The screen reader would simply read straight across the row of data including all columns. This process results in a user encountering much irrelevant information, and other information which the user may not be interested in hearing, simply for the user to glean a few items of desired content. What is needed is a means of allowing the user of a screen reader to instruct the screen reader how to present tabular or other composite data in such a way that the user hears or is able to read the information in the order they wish to read it while skipping irrelevant components of the data. Thus, only desired data would be presented and it would be presented according to instructions by the user. What is further needed is a means of annotating the presented data with extra information to assist the user in the interpretation of that data.

SUMMARY OF INVENTION

The present invention is a customized control presentation tool that configures a screen reader to present tabular or other composite data to a user in the order most useful to the user. The tool includes the ability to configure the screen reader independently for both speech and Braille output on a control by control basis. This customized control presentation is saved in permanent storage. Consequently, each time the screen reader is presented with this instance of the control, the screen reader immediately knows how to present it to the user. The software product allows a user to modify the output by the screen reader of the data according to preferences configurable by the user. These preferences may include the ability to skip display information, to specify the order in which the screen reader presents the display information and the ability to alter the headers associated with the display information. By altering the headers the user may annotate the headers to provide additional information about the underlying data. The headers may also be output in an alternative voice by a speech synthesizer to queue a user to a change of information. The user may also specify that certain display information is sent by the screen reader to one display device while other display information is sent to an alternative display device.

One aspect of the present invention provides a screen reader software product. The software product includes a screen reader module, a broadcast module and a control presentation module. The screen reader module is communicatively coupled with resident software on a computer. The screen reader module is adapted to display information generated by the resident software. The broadcast module is communicatively coupled to the reader module and is adapted to communicate the display information collected by the reader module to an output device. The control presentation module is coupled to the broadcast module and is adapted to control the output of composite data according to one or more preferences configurable by a user. The control presentation module is adapted to allow the user to alter the display information presented for a header. The header can also be configured such that the voice spoken by the speech synthesizer is different for the header when compared to the associated data. By speaking the header in a different voice the user is queued regarding the change in nature of the data. The control presentation module is further adapted to change the order of presentation of composite data. The user may rearrange the order in which a subset of data is presented. The user may also elect not to have a particular subset of data presented.

In another aspect, the invention provides a method of controlling the output of a listview in a computer having a screen reader function. The method includes the steps of generating an identifier for a listview control in focus, comparing the generated identification for the listview control with a screen reader data store comprising an array of identifiers to identify the listview instance and outputting the associated listview data for the identified listview instance according to one or more preferences configured by a user specific to the listview instance.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
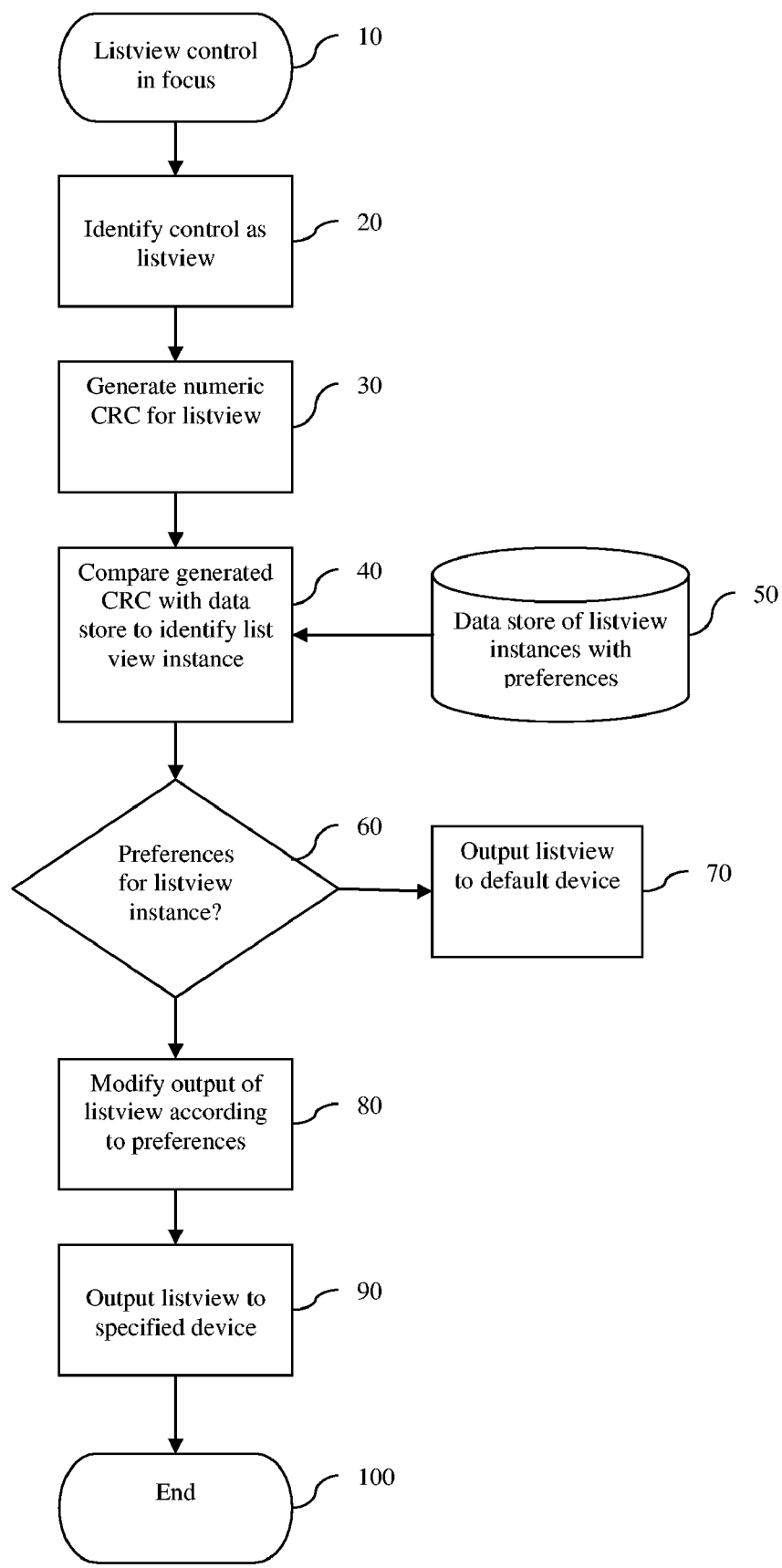
FIG. 1 is a flowchart depicting a method of controlling the output of a listview in a computer having a screen reader function.

The present invention enables a user of a screen reader to instruct the screen reader how to present tabular or other composite data so that the user hears, or is able to read, the information in a desired order. Additionally, the user is able to instruct the screen reader to skip irrelevant components of the data. The user can also annotate the data with extra information that can be subsequently output along with the desired data to assist in the interpretation of that data.

A screen reader employing the invention can be instructed to perform a variety of display functions based upon a particular user's needs. For instance, the invention provides a means for the user to instruct the screen reader to read, or otherwise display, only the columns or rows of interest in the order of interest. Concurrent with the auditory output of information, a screen reader according to the invention could independently display, via a Braille device, other columns or rows of interest in the order of interest. Some columns or rows could be skipped. The column or row headings of certain columns or rows may also be spoken or Brailled prior to the data in that column or row. Additionally, the column or row title may even be modified to make it more succinct or to remove it from the speech or Braille output altogether. Each time the screen reader sees this control in this application from then on, reading across the row or down the column, the screen reader would output the data in the prescribed manner.

One application of the invention facilitates the handling of listview features by a visually-impaired or blind user. Methods and systems for accessing operating systems resources via listview controls are known in the art and taught in U.S. Pat. No. 6,961,944 B2 (Chew et al.), the contents of which are incorporated herein by reference. The present invention configures a screen reader to automatically speak or Braille listview information as the user requires. A list view is an area in a window or dialog box that contains one or more items, such as files, folders, records, and so on. The list view usually contains multiple columns that display information about each item in the list. You can use a customize list view feature to change how a screen reader such as JAWS provides you with information about these columns and items. Using this feature, you can instruct a screen reader to perform a number of tasks including: (1) Change the order in which the screen reader reads columns in the list view; (2) instruct the screen reader not to speak certain columns or show them on your Braille display; (3) choose a voice alias that the screen reader uses when reading column headers; (4) choose whether the screen reader should speak column headers and/or display them in Braille; (5) assign custom text to each column header that the screen reader can speak and/or display in Braille.

This invention has relevance to many blind and visually-impaired users because in many applications the user's pattern of usage or requirements is only to glean some of the otherwise overwhelming or irrelevant data for the user's specific needs. These usage patterns and requirements can be leveraged the instant product by stripping away the unimportant data and allowing the user to concentrate on the relevant information.

As an example, consider a particular view in a source control database. There could be 10 different columns of information including ChangeList, change description, user who made the change, date of change, change type, revision number, etc. When a user lands in this view he or she may only be interested in the change description and user who made the change. The date of change, change type, revision number and other information may be of little importance to them. Waiting while the screen reader displays the information associated with these categories may be consume a great deal of time that the user would prefer not to waste. The user may also want to hear the user who made the change prior to the change description. Thus the invention would allow the reader to specify the two columns to speak and change the order in which they are spoken but still show all of the columns (in a different order in Braille) to what they are shown visually on the screen. As the user then arrows up and down the rows, the screen reader only reads the two columns in the modified order and displays the data in the modified order in Braille.

The user interface ("UI") allows the user to choose the columns (or rows) in this particular instance of the control to include in the output and to specify the order of presentation. It also allows the user to annotate or remove the column or row headings. Similar but independent pages of the dialog allow the output presentation to be defined for the different output modalities, eg Braille and Speech.

The screen reader obtains the necessary information from the control by communicating with the control, requesting from the control the number of columns or rows, the column or row headings and other relevant information. For example, the Microsoft Listview control provides a series of messages which may be sent to the control to obtain information from the control. The screen reader sends these messages to request the listview headers, column or row number, and other relevant information. Once the screen reader has the necessary information about this instance of the control it generates a unique identification (ID) for this listview so that it can identify this instance of the control next time it gains focus. It does this by generating a cyclic redundancy check ("CRC") of the control's headers and optionally the control's own application specific ID and class name. When the listview (or other control) next gains focus, the screen reader generates the CRC to identify the instance of the control and looks up the ID of the instance in its data store. If a customized presentation for this instance exists, it is used to present the data to the user via speech or Braille in the manner originally prescribed by the user. In an analogous manner to that of the listview presented above, the present invention can be used to handle other tabular or composite data including that provided by various application programs. For example, in a spreadsheet, the screen reader uses the Native Object model or any other means at its disposal to obtain this information including gleaning it from its own Off Screen Model of the screen data. Thus, the present invention enables the synthesis of a screen reader software system with the ability to manipulate the output of tabular or other composite data in a manner configurable by a user to meet that user's particular preferences.

FIG. 1 shows a method of controlling the output of a listview in a computer having a screen reader function according to an embodiment of the present invention. To present the data, the screen reader obtains the data and headers from the control using the control's object model or window messages or by determining the data and headers from its own off screen model of the data. An example of the custom control presentation process on a computer having a screen reader is as follows:

1. Focus lands on a listview control 10.
2. The screen reader identifies this control as a listview (via its class name) 20.
3. The screen reader then sends the relevant listview control messages to obtain the listview headers and column count. More specifically, the screen reader obtains the control ID of the window containing the listview using the function GetDlgCtrlID and converts this numeric value to a string named szChecksum. For each column of the ListView, use ListView_GetColumn to obtain the heading for that column and concatenate it's heading to the existing contents of szChecksum. Compute a standard CRC32 checksum of szChecksum 30. This numeric CRC can then be used to identify the specific listview instance.
4. The screen reader looks up 40 the aforementioned CRC in a data store 50 to identify the specific listview instance, and to associate the user-preferences with the listview instance 80.
5. Based upon the identity of the listview instance, the screen reader is able to determine which columns of data the user wants to hear for the particular instance of the listview. The listview is then output 90 to the one or more output devices according to the user preferences 80. For example, the screen reader might determine that the user only wants to hear column 3 followed by column 2 of a 10 column table. Further, the user might prefer not to hear the column headers, but want all columns in Braille in reverse order with the column header preceeding the data of the column. In so doing, ListView_GetColumn is called repeatedly to obtain header and item information for the columns of interest to the user.

As the user arrows up and down through the list in the particular instance of the listview outlined, the screen reader ensures that just the data from the 3rd and 2nd columns are presented by the speech synthesizer, while the Braille device presents the user with all ten columns in Braille in the reverse order to the visual representation of the data as it would otherwise be displayed on a monitor. Additionally, the column header of each column is presented to the user preceding the data of that column. The user can also use other features of the screen reader to read a column's data directly by issuing a keystroke or hear all the data in the entire row in visual order using another keystroke.

Figure 2:
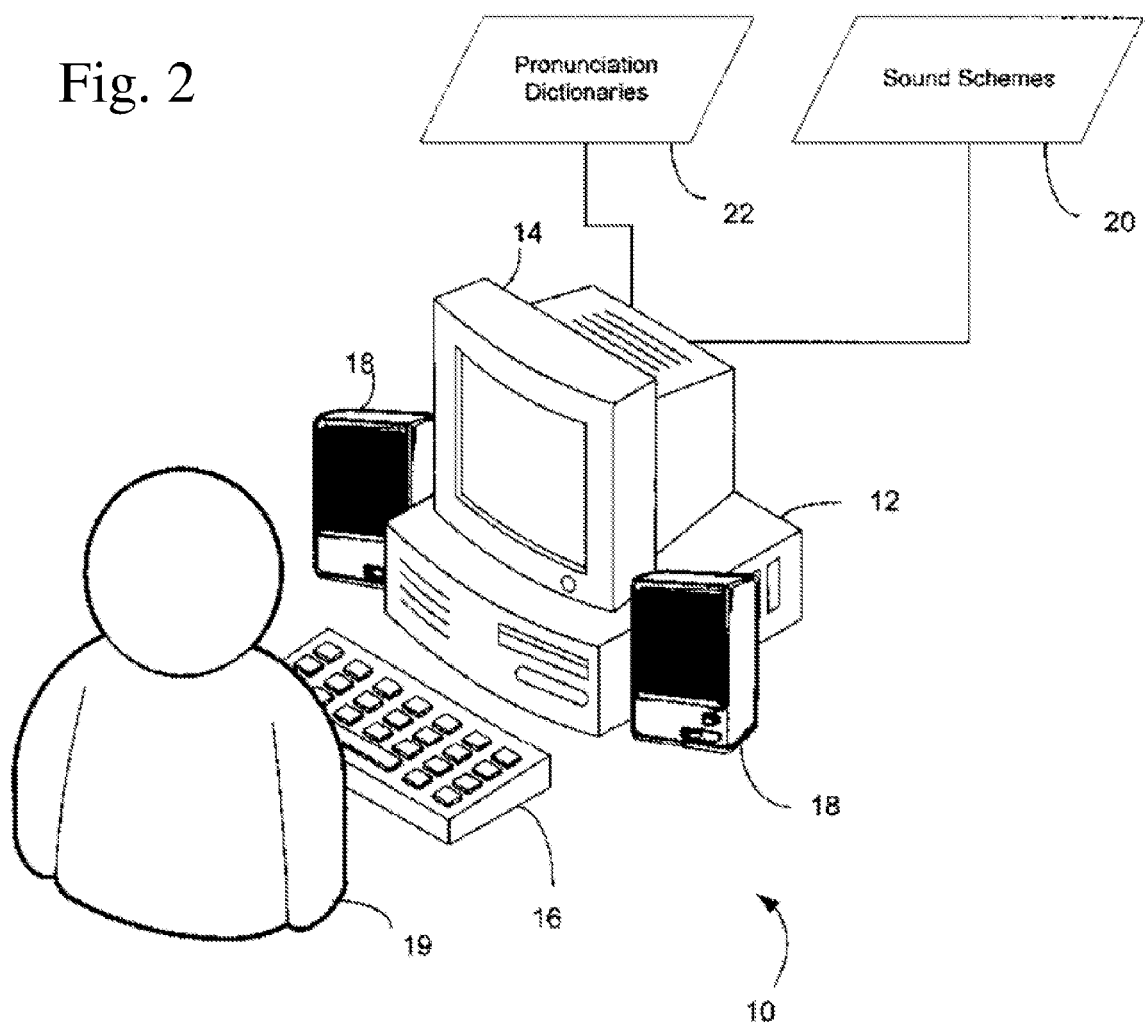
FIG. 2 is an illustration of a computer user in front of a CPU and display monitor with two speakers.

FIG. 2 shows an operational embodiment of the environment of the present invention. The invention is illustrated as operational with a computer such as an IBM compatible personal computer 10 having a central processing unit 12 and, optionally, a monitor 14. Computer 10 further includes at least one audio speaker 18 and a user input device 16. The input device may be a keyboard, a mouse, a microphone, a pointing device, or the like. The invention may be embodied on computer-readable medium, such as a diskette or the like, containing program code. At least one screen reader program, capable of generating human perceptible speech with speaker 18, is installed on computer 10. The at least one screen reader program may be one or more commercially available programs, including JAWS™, a product of Freedom Scientific, Inc., Microsoft Speech™, a product of Microsoft Corporation, and Window-Eyes™, a product of GW Micro, Inc. However, other screen readers may be used. Computer 10 may be of the type available from numerous manufacturers and using various processors. The invention is illustrated with such a computer running a Windows XP or newer operating system supportive of ActiveX applications. However, this is for illustration purposes only. Other computer system configurations may be utilized with the present invention. Computer 10 may be a standalone computer or a portion of a network, such as a local area network, a wide area network, or a global network such as the Internet.

A user can now see and hear exactly the data wanted in the order desired.

New Keystrokes

As well as the new automatic custom presentation, the keystrokes JAWSKey+Control+ 1 through 0 maybe used to speak the data in columns 1 through 10 in the current row respectively.

The User Interface

The UI will need to be able to be invoked from any listview. It will need to contain the following controls:

Control: Listview
Prompt: Speak Which Listview Columns
Content: The headers from the original listview
Controls: Buttons
Move up: move the current selection up in the list (ie speak it earlier than another column
Move down: move the selected column down (so it is spoken later in the order)
Remove: Prevent this column from being spoken at all.
Customize Text: When this button is pressed, the user may add text to be spoken (or Brailled) prior to or instead of the current header.
Control: Groupbox:
Prompt: Column Headers:
Controls: radio buttons
Ignore: Don't speak at all
Speak Custom text or header: if custom text has been defined, speak it, otherwise speak the header
Speak custom text and header: speak the custom text and the header Speak custom text only: ignore the header and only speak custom text if it is defined within this groupbox but as a separate button Choose Voice Alias to speak headers Controls: buttons Ok: okay the dialog and save the changes Cancel: dismiss the dialog without saving changes.

Configuration Data

The data for this configurability is written to the [Listview Options] section of the application or default.jcf (layered).

The format of the section is as follows:

key=nSpeakHeader:optional voice alias|FirstColNumToSpeak:optional custom header text|SecondColNumToSpeak:optional custom header text| . . .

The key is calculated using a 32 bit CRC of the control ID and text of the first 10 column headers concatenated together giving a unique value. This is almost absolutely guaranteed to be unique for all listviews in the system. If two listviews do have the same control ID and exactly the same first 10 column headers, they are likely to be logically the same and thus the rule for one should be fine to be used for the other. The nSpeakHeader value maybe 0 to ignore headers, 1 to speak the custom text (if it exists) or the actual header, 2 means speak the custom text and the header and 3 means only speak the optional custom text. A column number maybe replaced by a * to indicate to read the rest of the columns in their natural order.

Some Examples:

[Listview Options]

23ab2f15=1|4|3|1:change number|2|

4e456059=1:Shelly|7|5|2|1|6|3|4| default=1|*

The first example is from my p4win.jcf and says to speak columns 4, 3, 1 and 2 with column headers for the submitted changelist listview (for the changelist column, speak the words change number instead). The second example is also from my p4win.jcf and says to speak columns 7, 5, 2, 1, 6, 3 and 4 from the changelist history list with column headers being spoken using Shelly's voice (since there is lots of data, it helps using a different voice to distinguish the header from the data. The third example from my p4win.jcf just says that for all the rest of the listviews in Perforce, speak the column headers and columns in their natural order.

Braille

An almost identical dialog needs to be created for Braille Structured Mode. The only difference being that there is no need to have the choose voice alias button since the optional voice alias part of the data is ignored. The configuration data for Braille is read from the application or default.jbs file from the [Listview Options] section. Other than that, everything else is identical.

Additional Examples of the User Interface

The user may again be presented with a 10 column table. The user may wish to hear column 1 followed by column 4 followed by column 6, but have column 2 and 5 Brailled on the display. They may also wish to have the column headers precede the data in each column in Braille but not in speech. They may even like to have some column headers read while changing what gets spoken for another. The user may even select a different voice to speak the header information to differentiate it from the data. This can be done on a listview by listview case or can be defined for all listviews in an application or everywhere. You will never have to hit sayLine again and hear all the extra verbiage from a listview.

What is claimed is:

1. A method of controlling the output of a listview in a computer having a screen reader function comprising the steps of:

compiling an array of identifiers, with each identifier corresponding to a unique listview instance;

storing the compiled array in permanent storage;

configuring user preferences for particular listview instances, the user preferences corresponding to non-visual output modifications of the unique listview instance;

storing the user preferences in permanent storage;

focusing on a unique listview instance;

obtaining an identifier for the unique listview instance in focus;

comparing the obtained identifier with the array of identifiers in permanent storage so as to correlate the unique listview instance with its associated user preferences;

automatically applying the non-visual output modifications associated with the identified listview according to associated user preferences; and outputting the listview data according to the associated modifications to one or more non-visual output devices selected from the group consisting of audible devices and tactile devices for presentation to a user wherein the visual listview instance is otherwise unmodified by the method.

2. The method according to claim 1 wherein each identifier is obtained from a computed checksum of a control ID of the listview and the column headers of the listview concatenated together.

3. The method according to claim 1 wherein the audible output device is a speech synthesizer.

4. The method according to claim 1 wherein the tactile output device is a Braille device.

5. The method according to claim 1 wherein the audible and tactile output devices are independently configurable to output a first portion of the associated modifications to a speech synthesizer and a second portion of the associated modifications to a Braille device.

6. The method according to claim 1 wherein the user preferences include a preference to alter the header text.

7. The method according to claim 3 wherein the header is output to the speech synthesizer in an alternative voice.

8. The method according to claim 1 wherein the user preferences include a preference to alter the order of presentation of the listview data.

9. A screen reader software product including software executable instructions stored in a computer readable medium for performing a method by running a software program on a computer, the screen reader software product comprising:

a screen reader module communicatively coupled with a resident software application loaded on a computer that displays an array of tabular data, the screen reader module intercepting the tabular data generated by the resident software application;

a control presentation module communicatively coupled to the screen reader module, the control presentation module specifying a predetermined subset of data in the tabular data for non-visual output; and a broadcast module communicatively coupled to the screen reader module, the control presentation module, and a non-visual output device, wherein the broadcast module is configured to automatically transmit only the subset of data to the non-visual output device whereby the data visually displayed in the array of tabular data is not otherwise reduced to the subset of data that is non-visually output.

10. The screen reader software product of claim 9 wherein the subset of data extracted by the control presentation module is selected from the group consisting of columns, rows and headers.

11. A screen reader software product including software executable instructions stored in a computer readable medium for performing a method by running a software program on a computer, the screen reader software product comprising:
    a screen reader module communicatively coupled with a resident software application loaded on a computer that displays a listview control, the screen reader module intercepting an instance of the listview control displayed by the resident software application;
    a control presentation module communicatively coupled to the screen reader module, the control presentation module specifying a predetermined subset of data in the listview control for non-visual output according to a unique identifier associated with the listview control, the subset of data selected from the group consisting of columns, rows, and headers; and
    a broadcast module communicatively coupled to the screen reader module, the control presentation module, and a non-visual output device, wherein the broadcast module is configured to automatically transmit only the subset of data to the non-visual output device whereby the data visually displayed in the instance of the listview control is not otherwise reduced to the subset of data that is non-visually output.

12. The screen reader software product according to claim 11 wherein the output device is a speech synthesizer.

13. The screen reader software product according to claim 11 wherein the output device is a Braille display.

14. The screen reader software product according to claim 11 wherein the output device is an array of a speech synthesizer and a Braille display, the control presentation module specifies a first portion of the subset of data to be output by the speech synthesizer and a second portion of the subset of data to be output by the Braille display;
    and the broadcast module automatically transmits the first portion of the subset of data to the speech synthesizer and the second portion of data to the Braille display.

15. The screen reader software product according to claim 14 wherein listview column headers are transmitted to the Braille display and listview rows are transmitted to the speech synthesizer.

16. The screen reader software product according to claim 14 wherein listview rows are transmitted to the Braille display and listview column headers are transmitted to the speech synthesizer.

17. The screen reader software product according to claim 11 wherein additional data contained within the listview control instance but not within the subset of data is transmitted responsive to a keystroke entered by an end-user.

18. A screen reader software product including software executable instructions stored in a computer readable medium for performing a method by running a software program on a computer, the screen reader software product comprising:
    a screen reader module communicatively coupled with a resident software application loaded on a computer that displays a listview control having at least two columns containing tabular data, the screen reader module intercepting an instance of the listview control displayed by the resident software application;
    a control presentation module communicatively coupled to the screen reader module, the control presentation module reordering the at least two columns in the listview control for non-visual output according to a unique identifier associated with the listview control; and
    a broadcast module communicatively coupled to the screen reader module, the control presentation module, and a non-visual output device, wherein the broadcast module is configured to automatically transmit reordered column tabular data to the non-visual output device whereby the tabular data visually displayed in the instance of the listview control is not otherwise reordered.

19. The screen reader software product of claim 18 wherein the listview control has a plurality of rows which are reordered by the control presentation module for output by the broadcast module.

20. A screen reader software product including software executable instructions stored in a computer readable medium for performing a method by running a software program on a computer, the screen reader software product comprising:
    a screen reader module communicatively coupled with a resident software application loaded on a computer that displays a listview control having at least one column header, the screen reader module intercepting an instance of the listview control displayed by the resident software application;
    a control presentation module communicatively coupled to the screen reader module, the control presentation module renaming the column header in the listview control for non-visual output according to a unique identifier associated with the listview control; and
    a broadcast module communicatively coupled to the screen reader module, the control presentation module, and a non-visual output device, wherein the broadcast module is configured to automatically transmit the renamed column header to the non-visual output device whereby the column header visually displayed in the instance of the listview control is not otherwise renamed.

21. The screen reader software product of claim 20 wherein the control presentation module renames row titles for output by the broadcast module.

22. A screen reader software product including software executable instructions stored in a computer readable medium for performing a method by running a software program on a computer, the screen reader software product comprising:
    a screen reader module communicatively coupled with a resident software application loaded on a computer that displays a listview control having at least one column header and tabular data in rows thereunder, the screen reader module intercepting an instance of the listview control displayed by the resident software application;
    a broadcast module communicatively coupled to the screen reader module and a speech synthesizer having a having a first voice and a second voice; and
    a control presentation module communicatively coupled to the screen reader module and the speech synthesizer, the control presentation module assigning the second voice to the column header in the listview control for non-visual output according to a unique identifier associated with the listview control, wherein the broadcast module is configured to automatically transmit the column header to the speech synthesizer in the second voice and the tabular data in the first voice.

23. The screen reader of claim 22 wherein the speech synthesizer outputs at least one preselected row in the listview control in the second voice.

24. The screen reader of claim 22 wherein the speech synthesizer outputs at least one preselected column in the listview control in the second voice.

* * * * *